No. 786,004.                                                         Patented March 28, 1905.

UNITED STATES PATENT OFFICE.

MAX COHN, OF BERLIN, GERMANY.

METHOD OF PREPARING DRESSINGS FOR BANDAGES.

SPECIFICATION forming part of Letters Patent No. 786,004, dated March 28, 1905.

Application filed July 1, 1904. Serial No. 215,038.

*To all whom it may concern:*

Be it known that I, MAX COHN, a subject of the King of Prussia, German Emperor, and a resident of 45$^E$ Pankstrasse, Berlin, Kingdom of Prussia, German Empire, have invented a new and useful Process of Manufacturing Dressing or Bandaging Stuffs for Dressing Wounds, of which the following is an exact specification.

My invention relates to a process of manufacturing dressing stuffs for dressing wounds, especially dressing-gauze, which work both in an aseptic and antiseptic manner.

It is known that the dressing-gauze for itself as a beforehand cohering material highly possesses the quality of absorbing and drying out. These qualities can be increased by combining with this coherent material suitable non-coherent pulverized substances. A pulverized earthy substance commercially known under the name of "bolus-white," "bolus-red," or "armenia-bole," which is a silicate of alumina, possesses the quality of highly absorbing and drying out the secretions of wounds. It absorbs even great quantities of a fluid, not all at once, but gradually. The bole has hitherto been employed in such a manner that it was applied directly to the wound either for itself—*i. e.*, in form of a powder and then covered with gauze—or it was first loosely strewn in small pouches or bags, and thereby applied to the wounds. Such a management has the disadvantage that great care must be taken, and in spite of this an injurious effect can arise, as even at the slightest quick motion of the stuff the bole-powder dusts out, fills the cavities of the wound, pastes up the wound-surfaces, and prevents a continuous evaporation and drying out of the secretions. My present invention gets rid of these disadvantages. The gauze or the stuff is made suitable to take up great quantities of bole, so that a dusting out is prevented, and also the quality of both materials to absorb is not diminished, thereby avoiding a loss of the aseptic qualities of the materials. By my invention an antisepsis of the gauze is at the same time produced, as the preparation of the gauze or the like makes it possible to incorporate also other suitable substances without diminishing the qualities of the gauze as bole-gauze.

The essential feature of the process consists in incorporating into the stuff the bole in combination with a soap, preferably resinous soap. By employing soap considerably more bole can be made adhere. On the other hand substances as alkali, turpentine-oil, benzoic acid, acetic acid, and the like work antiseptically or influence the asepsis or solution, can better be incorporated in emulsion or solution on account of the presence of soap, without reducing by these admixtures the important qualities of the bole-gauze to suck up.

In the following an example for manufacturing dressing-gauze shall be described.

One kilogram of good white bole and three hundred and fifty grams of a solution of caustic soda of five per cent. is boiled in a water-bath. Hereby not only a removal of a part of the water, but also a certain decomposition of bole, probably takes place. If the mixture has become half soft, it is stirred up with about three hundred grams of turpentine-oil and fifty grams of colophony. This mixture is then once more treated in a water-bath for about one hour. The result is a half-soft paste, to which in certain cases benzoic acid or the like can be added. For using this paste the same is stirred up in water and the gauze is impregnated with this milk-like fluid. This impregnated gauze is then dried.

Having thus fully described the nature of my invention, what I desire to secure by Letters Patent of the United States is—

1. The method of preparing a dressing for bandages or the like which consists in suspending bole in a resin-soap solution, impregnating the gauze or fabric therewith and drying the same.

2. The method of preparing a dressing for bandages or the like which consists in suspending bole in a mixture of alkali and resin, and impregnating the gauze or fabric therewith, and then drying the same.

3. The method of preparing a dressing for bandages or the like, which consists in suspending bole in a resin-soap solution containing caustic soda in water, adding thereto benzoic acid, impregnating the gauze or fabric therewith, and then drying.

In testimony whereof I have signed my name to this specification in the presence of two subscribing witnesses.

MAX COHN.

Witnesses:
WOLDEMAR HAUPT,
HENRY HASPER